(12) United States Patent
Murakami

(10) Patent No.: US 9,163,745 B2
(45) Date of Patent: Oct. 20, 2015

(54) SOLENOID VALVE

(71) Applicant: JTEKT CORPORATION, Osaka-shi, Osaka (JP)

(72) Inventor: Toshio Murakami, Nagoya (JP)

(73) Assignee: JTEKT CORPORATION, Osaka (JP)

( * ) Notice: Subject to any disclaimer, the term of this patent is extended or adjusted under 35 U.S.C. 154(b) by 271 days.

(21) Appl. No.: 13/919,277

(22) Filed: Jun. 17, 2013

(65) Prior Publication Data

US 2013/0341544 A1    Dec. 26, 2013

(30) Foreign Application Priority Data

Jun. 25, 2012   (JP) ................................. 2012-142338

(51) Int. Cl.

| | |
|---|---|
| *G05D 16/20* | (2006.01) |
| *F16K 31/00* | (2006.01) |
| *F15B 13/044* | (2006.01) |
| *F16K 31/06* | (2006.01) |
| *B60T 8/36* | (2006.01) |

(52) U.S. Cl.
CPC .............. *F16K 31/06* (2013.01); *F16K 31/0613* (2013.01); *B60T 8/36* (2013.01); *F15B 13/044* (2013.01)

(58) Field of Classification Search
CPC .......... F16K 31/06; B60T 8/36; F15B 13/044
USPC .............. 251/129.15; 137/550, 82; 303/119.2
See application file for complete search history.

(56) References Cited

U.S. PATENT DOCUMENTS

| | | | |
|---|---|---|---|
| 5,014,747 A * | 5/1991 | Suzuki et al. ............. | 137/625.65 |
| 5,603,483 A * | 2/1997 | Reuter et al. ............. | 251/129.02 |
| 8,186,378 B2 * | 5/2012 | Nordstrom et al. ........... | 137/550 |
| 2008/0223778 A1 | 9/2008 | Yoshida et al. | |
| 2010/0243085 A1* | 9/2010 | Van Weelden et al. ....... | 137/544 |

FOREIGN PATENT DOCUMENTS

JP   A-2006-258161   9/2006

* cited by examiner

*Primary Examiner* — Craig Schneider
*Assistant Examiner* — Joseph P Heil, Sr.
(74) *Attorney, Agent, or Firm* — Oliff PLC

(57) ABSTRACT

A solenoid valve includes: a valve body having a fitting hole; a tubular sleeve fitted in a fitting hole and having a valve hole, a supply port, and an output port; and a spool valve that is accommodated in the valve hole of the sleeve and that changes a flow passage area between the supply port and the output port by moving axially. A pair of recessed portions is formed in an outer peripheral face of the sleeve, at positions on axially opposite sides of the supply port, so as to extend in the circumferential direction of the sleeve. A strip-shaped first strainer is fitted in the recessed portions. A cutout into which a pressure for suppressing an offset of the central axis of the sleeve from the central axis of the fitting hole, is formed in the sleeve so as to be communicated with the supply port.

2 Claims, 3 Drawing Sheets

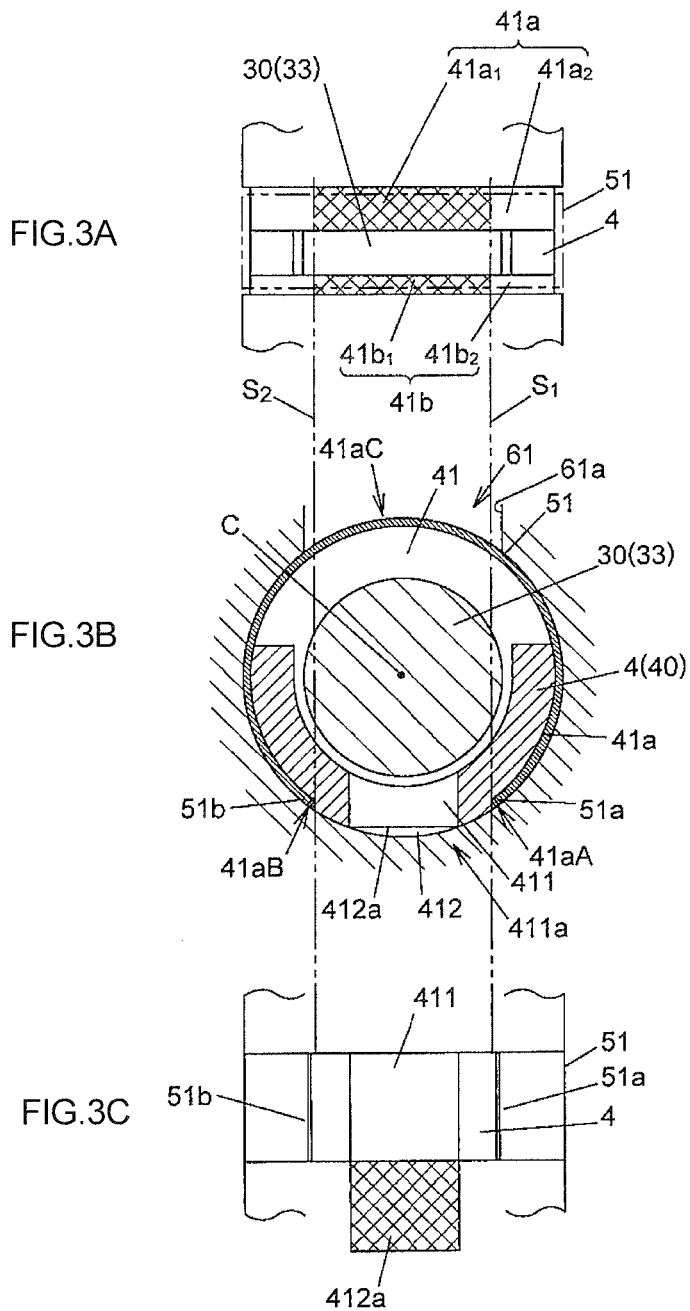

SOLENOID VALVE

INCORPORATION BY REFERENCE

The disclosure of Japanese Patent Application No. 2012-142338 filed on Jun. 25, 2012 including the specification, drawings and abstract is incorporated herein by reference in its entirety.

BACKGROUND OF THE INVENTION

1. Field of the Invention

The invention relates generally to a solenoid valve that outputs hydraulic fluid on the basis of an exciting current applied to a coil, and more specifically to a solenoid valve having a strainer that blocks entry of foreign matter into the solenoid valve.

2. Description of Related Art

There is a conventional solenoid valve that includes a shaft-shaped spool valve housed in a tubular sleeve so as to be movable in its axial direction, and that is configured such that a flow passage of hydraulic fluid and a flow passage area are changed by moving the spool valve in the axial direction. In some solenoid valves of this type, a strainer that blocks entry of foreign matter is arranged at a supply port for the hydraulic fluid (see, for example, Japanese Patent Application Publication No. 2006-258161 (JP 2006-258161 A).

The strainer described in JP 2006-258161 A has an arc-shaped filter portion and a pair of engaging portions. The engaging portions are engaged with engaged portions formed in a strainer-attached portion of the sleeve. The strainer-attached portion is formed in a U-shape so as to surround the spool valve.

The sleeve is fitted in a fitting hole formed in a valve body, and the hydraulic fluid is supplied into the supply port through a supply passage of the valve body. In the solenoid valve described in JP 2006-258161 A, the strainer-attached portion is formed so as to be asymmetric with respect to the central axis of the sleeve. As a result, the central axis of the sleeve may be offset from the central axis of the fitting hole of the valve body due to the hydraulic pressure of the hydraulic fluid supplied to the supply port.

If the central axis of the sleeve is offset from the central axis of the fitting hole of the valve body, the amount of leakage of the hydraulic fluid is increased. With an increase in the amount of leakage of the hydraulic fluid, the load on an oil pump that discharges the hydraulic fluid increases.

SUMMARY OF THE INVENTION

One object of the invention is to provide a solenoid valve provided with a filter member that blocks entry of foreign matter into a sleeve, and configured to suppress an offset of the central axis of the sleeve from the central axis of a valve body.

An aspect of the invention relates to a solenoid valve, including: a valve body having a fitting hole, a supply passage through which hydraulic fluid is supplied, and an output passage through which the hydraulic fluid is introduced to a controlled portion; a tubular sleeve fitted in the fitting hole of the valve body, and having a valve hole, a supply port communicated with the supply passage, and an output port communicated with the output passage; a spool valve that is accommodated in the valve hole of the sleeve so as to be axially movable, and that changes a flow passage area between the supply port and the output port by moving axially; and a solenoid portion that axially moves the spool valve. A pair of recessed portions is formed in an outer peripheral face of the sleeve, at positions on axially opposite sides of the supply port, so as to extend in a circumferential direction of the sleeve. A strip-shaped filter member is fitted in the recessed portions. A pressure introduction portion into which a pressure for suppressing an offset of a central axis of the sleeve from a central axis of the fitting hole, is formed in the sleeve so as to be communicated with the supply port.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 3A is a top plan view illustrating the first strainer fitted to a sleeve in the embodiment of the invention;

FIG. 3B is a sectional view taken along the line A-A in FIG. 1; and

FIG. 3C is a bottom view illustrating the sleeve.

DETAILED DESCRIPTION OF EMBODIMENTS

An embodiment of the invention will be described with reference to FIG. 1 to FIG. 3C.

Figure 1:
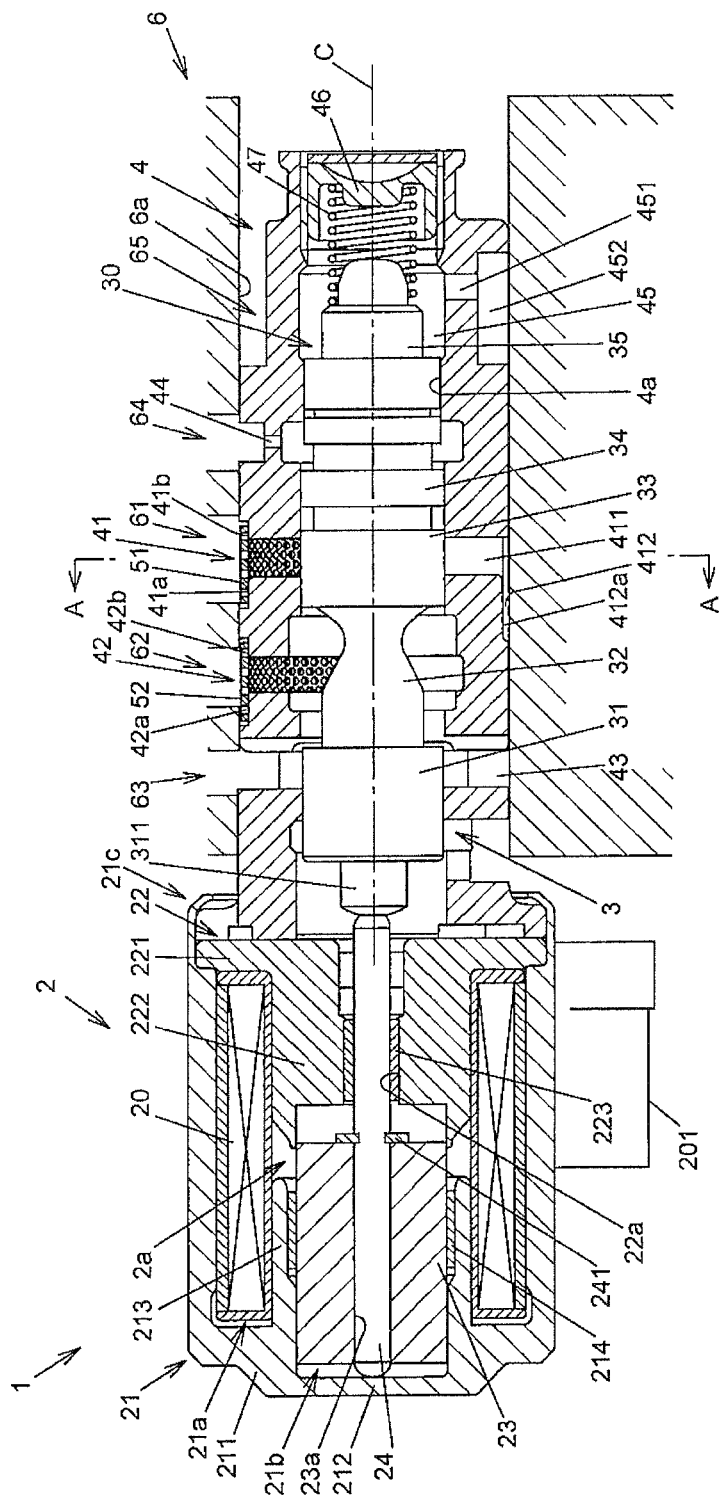
FIG. 1 is a sectional view illustrating an example of the configuration of a solenoid valve according to an embodiment of the invention.

FIG. 1 is a sectional view illustrating an example of the configuration of a solenoid valve 1 according to an embodiment of the invention. The solenoid valve 1 is mounted in, for example, a vehicle, and is provided in a supply passage through which a hydraulic pressure is supplied to an actuator that assists a shifting operation during shifting of an electronically-controlled automatic transmission, with the use of a hydraulic pressure.

The solenoid valve 1 includes a solenoid portion 2, a spool control valve 3 and a valve body 6. An exciting current is supplied to the solenoid portion 2. The spool control valve 3 is coupled to the solenoid portion 2. The spool control valve 3 is accommodated in the valve body 6.

The solenoid portion 2 includes an electromagnetic coil 20, a tubular cover member 21, a core member 22, and a plunger 23. The cover member 21 is made of a magnetic material. The core member 22 is also made of a magnetic material. The plunger 23 is axially movable, relative to both the cover member 21 and the core member 22.

The electromagnetic coil 20 is accommodated in an annular accommodation space 21a formed in the cover member 21. The electromagnetic coil 20 receives an exciting current from a connector portion 201 fixed to the outer periphery of the cover member 21 to generate a magnetic field. The electromagnetic coil 20 is accommodated in the accommodation space 21a such that one axial end of the electromagnetic coil 20 faces, in the accommodation space 21a, a bottom portion 211 of the cover member 21 and the other end of the electromagnetic coil 20 faces the core member 22.

The cover member 21 has a cylindrical portion 21b that accommodates the plunger 23, and that is formed radially inward of the accommodation space 21a that accommodates the electromagnetic coil 20. The cylindrical portion 21b is formed of a bottom portion 212 and a cylindrical protrusion 213 projected toward the core member 22 from the bottom portion 212. A bearing bushing 214 that guides an axial movement of the plunger 23 is arranged radially inward of the protrusion 213.

The core member 22 is a single-piece member having a flange portion 221 and a cylindrical projecting portion 222. The flange portion 221 axially faces the electromagnetic coil 20. The projecting portion 222 is projected toward both the bottom portion 212 and the protrusion 213 of the cover member 21 from the flange portion 221. An axial through-hole 22a is formed in the core member 22, and a bearing bushing 223 is arranged in the through-hole 22a. A gap 2a is formed between the distal end of the projecting portion 222 of the core member 22 and the distal end of the protrusion 213 of the cover member 21.

The plunger 23 is axially movable in the cylindrical portion 21b, and a through-hole 23a is formed in the center portion of the plunger 23. The base end of a shaft-shaped rod 24 is secured in the through-hole 23a. A stopper member 241 that restricts movement of the plunger 23 toward the core member 22 is secured to the outer periphery of the rod 24.

The rod 24 is guided by the bearing bushing 223 so as to pass through the through-hole 22a formed in the core member 22, and the distal end portion of the rod 24 sticks out from the flange portion 221 of the core member 22. The distal end portion of the rod 24, which sticks out from the core member 22, contacts one end of a spool valve 30 of the spool control valve 3, described later in detail, to push the spool valve 30, thereby moving the spool valve 30 in the axial direction.

The spool control valve 3 includes the shaft-shaped spool valve 30 and a tubular sleeve 4. A valve hole 4a in which the spool valve 30 is accommodated so as to be axially movable, is formed in the sleeve 4. One end of the sleeve 4 is swaged and fixed to a swaged portion 21c of the cover member 21 together with the flange portion 221 of the core member 22.

The spool valve 30 is a single-piece member having a first land portion 31, a small-diameter portion of which the diameter is smaller than the diameter of the first land portion 31, a second land portion 33, a third land portion 34 and a boss portion 35, which are arranged in this order from the solenoid portion 2 side. The spool valve 30 is elastically urged toward the solenoid portion 2 by a coil spring 47 that contacts the boss portion 35. A projection 311, which is projected toward the solenoid portion 2, is formed at the first land portion 31, and the distal end portion of the projection 311 contacts the distal end portion of the rod 24. In a non-excitation state of the solenoid valve 1, as shown in FIG. 1, the base end portion of the rod 24 contacts the bottom portion 212 of the cover member 21.

The sleeve 4 has a supply port 41, an output port 42, a drain port 43, and feedback port 44, and a spring chamber 45. Hydraulic fluid discharged from a discharge port of an oil pump (not shown) is supplied to the supply port 41. The output port 42 communicates with the supply port 41 when the solenoid valve 1 is in the operating state, and outputs the hydraulic fluid. The drain port 43 communicates with the output port 42 when the solenoid valve 1 is in the non-operating state, and drains the hydraulic fluid. The spring chamber 45 houses the boss portion 35 and the coil spring 47.

The spring chamber 45 is formed in a tubular shape, and an opening of the spring chamber 45 is blocked by a plug 46. One end of the coil spring 47 contacts the plug 46. Further, the outer periphery of the plug 46 is screwed to the inner face of the spring chamber 45. The spring chamber 45 is communicated with an annular groove 452 through a restriction hole 451, and the annular groove 452 is communicated at its upper portion with a sub-drain passage 65, as viewed in FIG. 1.

A first strainer 51, which serves as a filter member that blocks entry of foreign matter into the valve hole 4a of the sleeve 4, is fitted in the supply port 41. The first strainer 51 is attached with its axial end portions housed respectively in a pair of arc-shaped recessed portions 41a, 41b formed in the outer peripheral face of the sleeve 4. The recessed portions 41a, 41b are formed in the outer peripheral face of the sleeve 4, at positions on the axially opposite sides of the supply port 41, so as to extend in the circumferential direction of the sleeve 4. The configuration of the first strainer 51 will be described later.

Further, a second strainer 52, which blocks discharge of foreign matter, is fitted in the output port 42. The second strainer 52 is attached with its axial end portions housed respectively in a pair of arc-shaped recessed portions 42a, 42b formed in the outer peripheral face of the sleeve 4. In the present embodiment, the second strainer 52 has a configuration similar to that of the first strainer 51. However, the solenoid valve 1 may be formed without employing the second strainer 52.

The sleeve 4 is fitted in a fitting hole 6a formed in the valve body 6. The valve body 6 is accommodated, for example, in an oil pan of the electronically-controlled automatic transmission (not shown). The fitting hole 6a is opened at its axially opposite ends.

The valve body 6 has a supply passage 61, an output passage 62, a drain passage 63, a feedback passage 64 and the sub-drain passage 65. The supply passage 61 is communicated with the supply port 41. The output passage 62 is communicated with the output port 42. The drain passage 63 is communicated with drain port 43. The feedback passage 64 is communicated with the output passage 62. The sub-drain passage 65 is communicated with the space outside the fitting hole 6a. The hydraulic fluid discharged from the oil pump (not shown) is supplied to the supply port 41 through the supply passage 61. The hydraulic fluid output from the output port 42 is introduced into a controlled portion (for example, a clutch of the electronically-controlled automatic transmission) through the output passage 62. The hydraulic fluid drained from the drain port 43 is introduced into a drain tank (not sown) through the drain passage 63.

In the solenoid valve 1 having the above-described configuration, when an exciting current is applied to the electromagnetic coil 20, the plunger 23 is moved toward the core member 22 by a magnetic force exerted by the electromagnetic coil 20, and accordingly, the rod 24 pushes the spool valve 30 and the spool valve 30 is moved axially along a central axis C of the valve hole 4a. When the spool valve 30 is axially moved, the supply port 41 is communicated with the output port 42 through the small-diameter portion 32, and accordingly, the hydraulic fluid is supplied to the controlled portion from the output port 42 through the output passage 62. A feedback pressure is supplied into the feedback port 44 through the feedback passage 64. Thus, the spool valve 30 is pushed toward the solenoid portion 2 by the feedback pressure.

When the spool valve 30 is axially moved, the flow passage area between the supply port 41 and the output port 42 and the flow passage area between the output port 42 and the drain port 43 are changed. The spool valve 30 is located at such a position that a thrust force of the plunger 23 generated by a magnetic force from the electromagnetic coil 20 is balanced with the resultant of an urging force of the coil spring 47 and a force obtained by the feedback pressure.

According to the present embodiment, a cutout 412 serving as a pressure introduction portion, which is communicated with the supply port 41 and into which the hydraulic fluid supplied to the supply port 41 is introduced, is formed in the outer peripheral face of the sleeve 4. The pressure of the hydraulic fluid is supplied into the cutout 412 through a communication hole 411 that provides communication between the supply port 41 and the cutout 412, and the pressure of the hydraulic fluid is applied onto a pressure-receiving face 412a that defines the cutout 412. The pressure-receiving face 412a is formed, as a part of the outer peripheral face of the sleeve 4, in a flat face that is in parallel with the central axis C of the valve hole 4a. The cutout 412 and the configuration around the cutout 412 will be described later in detail.

Figure 2A:
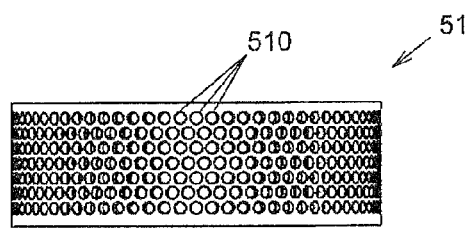
FIG. 2A is a top plan view illustrating a first strainer in the embodiment of the invention.
Figure 2B:
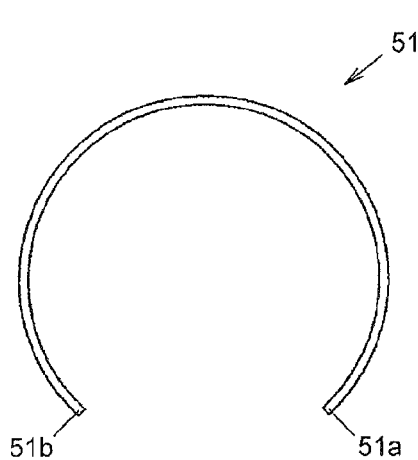
FIG. 2B is a front view illustrating the first strainer.
Figure 2C:
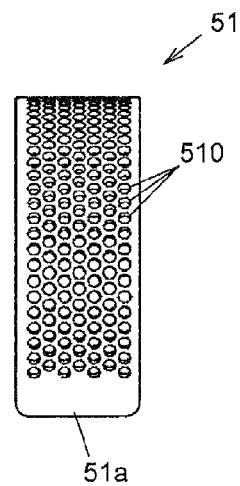
FIG. 2C is a side view illustrating the first strainer.

FIG. 2A to FIG. 2C show the first strainer 51. Note that FIG. 2A is a top plane view, FIG. 2B is a front view, and FIG. 2C is a side view.

The first strainer 51 has an arc-shaped strip shape, and is formed by bending a metal sheet such as a strip-shaped stainless steel sheet, into an arc shape. The first strainer 51 is perforated with a plurality of through-holes 510 that extend from the outer peripheral face of the first strainer 51 to the inner peripheral face of the first strainer 51. Each of the through-holes 510 has such a diameter that the hydraulic fluid is allowed to flow through the through-hole 510 but foreign matter adulterated in the hydraulic fluid is prevented from passing through the through-hole 510. The through-holes 510 are formed over the whole area of the first strainer 51 except both circumferential end portions 51a, 51b of the first strainer 51.

The first strainer 51 has an arc angle (angle from one end portion 51a to the other end portion 51b of the arc with respect to the center of the arc) which is equal to or larger than 180 degrees (276 degrees in the example shown in FIG. 2A to FIG. 2C). The arc radius is set to, for example, 5.8 mm, and the width (axial length) is set to, for example, 4.1 mm, and the thickness is set to, for example, 0.3 mm. Further, the diameter of each of the through-holes 510 is set to, for example, 0.4 mm.

FIG. 3A to FIG. 3C show the state in which the first strainer 51 is fitted to the sleeve 4. FIG. 3A is a top plan view illustrating the sleeve 4, FIG. 3B is a sectional view taken along the line A-A in FIG. 1, and FIG. 3C is a bottom view illustrating the sleeve 4.

In FIG. 3A, the outline of the first strainer 51 is indicated by a long dashed double-short dashed line, and the configuration of the sleeve 4 inside the first strainer 51 is indicated by a continuous line. Further, in FIG. 3A to FIG. 3C, two straight lines S1, S2 that are orthogonal to a line segment connecting one circumferential end 41aA and the other circumferential end 41aB of the recessed portion 41a to each other, and which respectively pass the one circumferential end 41aA and the other circumferential end 41aB, are indicated by long dashed double-short dashed lines.

As shown in FIG. 3B, the supply port 41 is formed in the sleeve 4 in a range where no wall portion 40 is formed. The wall portion 40 is formed in an arc shape so as to surround a part of the outer peripheral face of the spool valve 30, as view in a section including the supply port 41. The communication hole 411 is formed in the bottom portion of the wall portion 40, as viewed in an arc-shaped section. The hydraulic fluid passes through the through-holes 510, and then flows into the supply port 41.

The recessed portions 41a, 41b are circumferentially formed in the sleeve 4 so as to be parallel with each other, over a range that corresponds to the arc angle of the first strainer 51. FIG. 3B shows only the recessed portion 41a. The recessed portion 41a has a circumferential center portion 41aC that is located between the two straight lines S1, S2.

As shown in FIG. 3A and FIG. 3B, the communication hole 411 has an opening 411a, at a position between the circumferentially opposite end portions 51a, 51b of the first strainer 51, and is communicated with the cutout 412 at the opening 411a. The supply port 41 and the cutout 412 are communicated with each other through a clearance between the inner face of the wall portion 40 of the sleeve 4 and the outer face of the spool valve 30 and through the communication hole 411. That is, the hydraulic pressure of the hydraulic fluid in the cutout 412 is substantially equal to the hydraulic pressure of the hydraulic fluid that is supplied to the supply port 41.

The cutout 412 is formed at a position that is opposed to an opening 61a of the supply passage 61 in the fitting hole 6a, that is, to the circumferentially center portion 41aC of the recessed portion 41a, across the central axis C of the valve hole 4a. More specifically, the cutout 412 is formed so as to include a position which is point-symmetric to the center portion 41aC of the recessed portion 41a with respect to the central axis C, in an imaginary plane orthogonal to the central axis C. Further, the cutout 412 is formed so as to extend from the opening 411a of the communication hole 411 toward the solenoid portion 2 in parallel with the central axis C, along the axial direction of the sleeve 4.

The hydraulic pressure of the hydraulic fluid supplied to the supply port 41 is applied to the recessed portion 41a. Because the recessed portion 41a is formed in an arc shape as described above, the hydraulic pressure acting on the whole recessed portion 41a is not uniform in the circumferential direction of the sleeve 4. Namely, the hydraulic pressures acting upon the recessed portion 41a at positions outside the straight lines S1, S2 shown in FIG. 3B are canceled out each other, but the hydraulic pressure acting upon the recessed portion 41a at a position between the straight lines S1, S2 pushes the sleeve 4 against the valve body 6 so as to move the sleeve 4 away from the supply passage 61. Similarly, the hydraulic pressure acting on the recessed portion 41b at a position between the straight lines S1, S2 pushes the sleeve 4 against the valve body 6 so as to move the sleeve 4 away from the supply passage 61.

In FIG. 3A, the region between the straight lines S1, S2 in the recessed portion 41a, which is crosshatched, will be referred to as "first region 41a1", and the regions other than the first region 41a1 will be referred to as "second regions 41a2". Further, the region between the straight lines S1, S2 in the recessed portion 41b, which is crosshatched, will be referred to as "first region 41b1", and the regions other than the first region 41b1 will be referred to as "second regions 41b2". In FIG. 3C, the pressure-receiving face 412a is crosshatched.

If the sleeve 4 is pushed against the valve body 6 in a direction away from the supply passage 61 and the central axis of the sleeve 4 is radially offset from the central axis of the fitting hole 6a of the valve body 6, the amount of hydraulic fluid leaked from a clearance between the outer peripheral face of the sleeve 4 and the inner peripheral face that defines the fitting hole 6a is increased, and accordingly, the load on the oil pump that supplies the hydraulic fluid into supply port 41 is also increased. However, in the present embodiment, the cutout 412 formed in the sleeve 4 reduces the radial positional deviation of the sleeve 4 with respect to the valve body 6, which is caused by the hydraulic pressure non-uniformly acting on the recessed portion 41a and the recessed portion 41b.

Namely, by the pressure received by the pressure-receiving face 412a due to introduction of the hydraulic pressure of the hydraulic fluid into the cutout 412, the pressure exerted on the first region 41a1 of the recessed portion 41a and the pressure exerted on the first region 41*b*1 of the recessed portion 41*b* are at least partially cancelled out, so that an offset of the central axis of the sleeve 4 from the central axis of the fitting hole 6*a* of the valve body 6 is suppressed. That is, the pressure that suppresses an offset of the central axis of the sleeve 4 from the central axis of the fitting hole 6*a* of the valve body 6 is introduced into the cutout 412.

If the area of the pressure-receiving face 412*a* is A1 and the sum of the area of the first region 41*a*1 of the recessed portion 41*a* and the area of the first region 41*b*1 of the recessed portion 41*b* is A2, A1 is preferably set to a value within a range from 80 to 120% of A2 ($0.8 \cdot A1 \leq A2 \leq 1.2 \cdot A1$). More preferably, A1 is set to a value within a range from 90 to 110% of A2 ($0.9 \cdot A1 \leq A2 \leq 1.1 \cdot A1$) in the present embodiment, the recessed portions 41*b*, 41*a* and the cutout 412 are formed so as to satisfy the condition, A1=A2.

Thus, according to the present embodiment, by forming the cutout 412 in the sleeve 4, it is possible to suppress an offset of the central axis of the sleeve 4 from the central axis of the fitting hole 6*a* of the valve body 6, and accordingly, it is possible to suppress an increase in the load on the oil pump due to leakage of the hydraulic fluid. As a result, it is possible to improve the fuel efficiency of a vehicle in which the solenoid valve 1 is installed.

One example embodiment of the invention has been described as above. However, the invention is not limited to the above-described embodiment, and various modifications may be made without departing from the scope of the invention.

For example, in the above-described embodiment, the cutout 412 is formed so as to extend from the opening 411*a* of the communication hole 411 toward the solenoid portion 2. However, the configuration of the cutout 412 is not limited to this, and the cutout 412 may be formed so as to extend from the opening end of the communication hole 411 in a direction away from the solenoid portion 2 (so as to extend toward the coil spring 47). Further, the cutout 412 may be formed so as to extend from the communication hole 411 in both a direction toward the solenoid portion 2 and a direction away from the solenoid portion 2.

Further, in the above-described embodiment, the pressure-receiving face 412*a* is a flat surface in parallel with the axial direction of the sleeve 4. However, the configuration of the pressure-receiving face 412*a* is not limited to this, and the pressure-receiving face 412*a* may be, for example, a curved surface that is recessed toward the center of the sleeve 4.

Moreover, in the above-described embodiment, the recessed portions 41*a*, 41*b* are formed as arc-shaped grooves. However, the recessed portions 41*a*, 41*b* may be circumferential grooves that are formed in the outer peripheral face of the sleeve 4 and that extend over the entire circumference of the sleeve 4. In this case, the strainer 51 may be cylindrical. Note that, the same applies to the recessed portions 42*a*, 42*b* and the second strainer 52.

The use of the solenoid valve 1 is not particularly limited. The solenoid valve 1 may be used for various purposes.

According to the invention, it is possible to suppress an offset of the central axis of the sleeve, provided with the filter member that blocks entry of foreign matter, from the central axis of the valve body.

What is claimed is:

1. A solenoid valve for use with a controlled portion, the solenoid valve comprising:
   a valve body including:
     a fitting hole,
     a supply passage configured to supply hydraulic fluid, and
     an output passage configured to introduce the hydraulic fluid to the controlled portion;
   a tubular sleeve fitted in the fitting hole of the valve body, the tubular sleeve including:
     a valve hole,
     a supply port communicating with the supply passage,
     an output port communicating with the output passage,
     a pair of recessed portions formed in an outer peripheral face of the tubular sleeve, the pair of recessed portions being formed at positions on axially opposite sides of the supply port so as to extend in a circumferential direction of the tubular sleeve,
     a strip-shaped filter member fitted in the pair of recessed portions,
     a pressure introduction portion formed in the tubular sleeve and being configured to communicate with the supply port, the pressure introduction portion having a pressure suppressing an offset of a central axis of the tubular sleeve from a central axis of the fitting hole, and
     a communication hole formed in the tubular sleeve and being configured to communicate between the supply port and the pressure introduction portion, the communication hole having an opening at a position between circumferentially opposite ends of the filter member;
   a spool valve accommodated in the valve hole of the tubular sleeve so as to be axially movable, the spool valve being configured to change a flow passage area between the supply port and the output port by moving axially; and
   a solenoid portion configured to axially move the spool valve, wherein
     the pressure introduction portion is a cutout formed so as to extend from an opening of the communication hole along an axial direction of the tubular sleeve.

2. The solenoid valve according to claim 1, wherein the pressure introduction portion is formed in the tubular sleeve, the pressure introduction portion being formed at a position that is opposed to the opening of the supply passage in the fitting hole and is across a central axis of the valve hole.

* * * * *